(12) United States Patent
Vermeulen et al.

(10) Patent No.: US 10,530,560 B2
(45) Date of Patent: Jan. 7, 2020

(54) INTEGRATED CIRCUIT AND METHOD FOR PROCESSING SYNCHRONIZED NETWORK FRAMES USING A HARDWARE SYNCHRONIZATION CIRCUIT

(71) Applicant: NXP B.V., Eindhoven (NL)

(72) Inventors: Hubertus Gerardus Hendrikus Vermeulen, Eindhoven (NL); Nicola Concer, Eindhoven (NL)

(73) Assignee: NXP B.V., Eindhoven (NL)

( * ) Notice: Subject to any disclaimer, the term of this patent is extended or adjusted under 35 U.S.C. 154(b) by 187 days.

(21) Appl. No.: 15/187,490

(22) Filed: Jun. 20, 2016

(65) Prior Publication Data

US 2017/0366331 A1    Dec. 21, 2017

(51) Int. Cl.
*H04L 29/06* (2006.01)
*H04L 7/00* (2006.01)

(52) U.S. Cl.
CPC ............ *H04L 7/0008* (2013.01); *H04L 69/22* (2013.01)

(58) Field of Classification Search
CPC ...... H04J 3/0667; H04J 3/0688; H04J 3/0697; H04J 3/0658; H04J 3/0641; H04J 3/0661; H04J 3/14; H04J 3/1694; H04J 14/08; H04J 3/0632
See application file for complete search history.

(56) References Cited

U.S. PATENT DOCUMENTS

| 4,541,048 A | * | 9/1985 | Propster | G06F 15/8015 |
| | | | | 708/524 |
| 7,454,632 B2 | * | 11/2008 | Kardach | G06F 1/3228 |
| | | | | 713/300 |
| 2010/0262844 A1 | | 10/2010 | Diab et al. | |
| 2011/0276790 A1 | * | 11/2011 | Olson | G06F 7/728 |
| | | | | 712/222 |
| 2011/0305248 A1 | * | 12/2011 | Lin | H04L 12/4625 |
| | | | | 370/503 |
| 2012/0300859 A1 | * | 11/2012 | Chapman | H04J 3/0667 |
| | | | | 375/257 |
| 2015/0078404 A1 | | 3/2015 | Diab et al. | |

(Continued)

FOREIGN PATENT DOCUMENTS

EP          2 687 938 A2    1/2014

OTHER PUBLICATIONS

IEEE, "IEEE Standard for a Precision Clock Synchronization Protocol for Networked Measurement and Control Systems"; IEEE Std 1588; 289 Pages; Jul. 24, 2008.

(Continued)

*Primary Examiner* — Sai Aung
(74) *Attorney, Agent, or Firm* — Rajeev Madnawat

(57) ABSTRACT

In an embodiment, an integrated circuit (IC) device is disclosed. In the embodiment, the IC device includes an Ethernet frame processor, at least one Ethernet port coupled to the Ethernet frame processor, and a hardware synchronization circuit coupled to the Ethernet frame processor and to the at least one Ethernet port, the hardware synchronization circuit including a controller, a local clock, a media-independent peripheral coupled to the controller, and a media-dependent peripheral coupled to the media-independent peripheral, wherein power can be provided to the hardware synchronization circuit independent of the Ethernet frame processor.

17 Claims, 17 Drawing Sheets

(56) References Cited

U.S. PATENT DOCUMENTS

2015/0156261 A1* 6/2015 Blake .................. H04L 69/28
                                                    709/248

OTHER PUBLICATIONS

SAE Aerospace, "Time-Triggered Ethernet"; SAE AS6802; 108 Pages; Issued Nov. 2011.
"NXP Annouces Complete Automotive Ethernet Product Portfolio"; Source NXP Semincoductors Netherlands B.V., Aug. 6, 2015; https://globenewswire.com/newsrelease/2015/08/06/758567/10144134/en/NXPAnnouncesCompleteAutomotiveEthernetProductPortfolio.html?print=1; 3 pages; Downloaded Jun. 14, 2016.
"Timing and Synchronization for Time-Sensitive Applications"; IEEE P802.1AS-Rev/D3.0; 386 pages; Apr. 29, 2016.
Gothard et al.; "AVB for Automotive Use"; Avnu Alliance White Paper; pp. 1-9; Oct. 2, 2014.
IEEE, "Part 3: Carrier Sense Multiple Access with Collision Detection (CSMA/CD) Access Method and Physical Layer Specifications"; IEEE Std 802.3az-2010; 302 pages; Oct. 27, 2010.
Gamer, G M. et al. "Synchronization of audio/video bridging networks using IEEE 802.1AS," IEEE Communications Magazine, vol. 49, No. 2, pp. 140-147 (Feb. 2011).

* cited by examiner

INTEGRATED CIRCUIT AND METHOD FOR PROCESSING SYNCHRONIZED NETWORK FRAMES USING A HARDWARE SYNCHRONIZATION CIRCUIT

BACKGROUND

Conventional IEEE standards for Ethernet switching encompassed by IEEE 802.1Q are ill suited for use cases such as audio and video streaming over Ethernet and even less suited for control-type applications based on Ethernet. The set of standards encompassed by IEEE 802.1AVB extends the features of IEEE 802.1Q to satisfy the more stringent requirements for audio and video streaming. In particular, IEEE 802.1AS provides a standard for distributed synchronization needed to support synchronized packet processing. The standard defines an end node acting as a Grand Master that sends sync and follow-up frames to other end nodes in order to synchronize the other end nodes with the current time of the Grand Master.

SUMMARY

In an embodiment, an integrated circuit (IC) device is disclosed. In the embodiment, the IC device includes an Ethernet frame processor, at least one Ethernet port coupled to the Ethernet frame processor, and a hardware synchronization circuit coupled to the Ethernet frame processor and to the at least one Ethernet port, the hardware synchronization circuit including a controller, a local clock, a media-independent peripheral coupled to the controller, and a media-dependent peripheral coupled to the media-independent peripheral, wherein power can be provided to the hardware synchronization circuit independent of the Ethernet frame processor.

In another embodiment, the hardware synchronization circuit is configured to perform IEEE 802.1AS functions while the Ethernet frame processor is powered down.

In another embodiment, a double-type integer used in IEEE 802.1AS functions is stored in a 64-bit register with the first 4 bits allocated to an integer value and the trailing 60 bits allocated to a fractional value.

In another embodiment, timestamp values are stored using std_logic_vectors.

In another embodiment, rate ratio is calculated using a non-restoring division algorithm implemented via iterative subtraction and shifting using registers in the hardware synchronization circuit.

In another embodiment, residence time and propagation delay are calculated using subtraction and shift registers in the hardware synchronization circuit.

In another embodiment, a local synchronization clock is configured using separate adders and subtractors to detect and compute seconds and nanoseconds separately.

In another embodiment, the hardware synchronization circuit is configured to process a partial range of header data in an Ethernet frame and store the data in registers in the hardware synchronization circuit.

In another embodiment, the media-dependent peripheral is coupled to a single port.

In another embodiment, the controller is configured to forward a frame to at least one of a microcontroller coupled to the IC device and the Ethernet frame processor when the frame includes an IEEE 802.1AS function that the hardware synchronization circuit cannot process.

In another embodiment, a method for processing synchronized network frames is disclosed. In an embodiment, the method involves powering up a hardware synchronization circuit, receiving an IEEE 802.1AS frame, determining if the IEEE 802.1AS frame requires processing by a microcontroller, powering up the microcontroller, processing the IEEE 802.1AS frame using the microcontroller if the IEEE 802.1AS frame requires processing by a microcontroller, and powering down the microcontroller; and processing the IEEE 802.1AS frame using a hardware synchronization circuit if the IEEE 802.1AS frame does not require processing by a microcontroller.

In another embodiment, a double-type integer used in processing the IEEE 802.1AS frame is stored in a 64-bit register in the hardware synchronization circuit with the first 4 bits allocated to an integer value and the trailing 60 bits allocated to a fractional value.

In another embodiment, timestamp values are stored using std_logic_vectors.

In another embodiment, rate ratio is calculated using a non-restoring division algorithm implemented via iterative subtraction and shifting using registers in the hardware synchronization circuit.

In another embodiment, residence time and propagation delay are calculated using subtraction and shift registers in the hardware synchronization circuit.

In another embodiment, a local synchronization clock is configured using separate adders and subtractors to detect and compute seconds and nanoseconds separately.

In another embodiment, the hardware synchronization circuit is configured to process a partial range of header data in an Ethernet frame and store the data in registers in the hardware synchronization circuit.

In another embodiment, the controller is configured to forward a frame to at least one of a microcontroller coupled to the IC device and the Ethernet frame processor when the frame includes an IEEE 802.1AS function that the hardware synchronization circuit cannot process.

In another embodiment, an automobile Ethernet network is disclosed. In the embodiment, the network includes at least one switch, the switch configured with a hardware synchronization circuit and coupled to a microcontroller, at least one end node, the end node coupled to the switch, a microcontroller, and a transceiver within which a hardware synchronization circuit is configured, and a time-sensitive Ethernet device coupled to the microcontroller that is coupled to the end node, wherein the network is synchronized using IEEE 802.1AS, and wherein IEEE 802.1AS functions are performed by the hardware synchronization circuit in the switch and in the transceiver within the end node while the microcontrollers coupled to the switch and end node remain powered off.

In another embodiment, resynchronization of the powered off microcontrollers coupled to the at least one switch can be facilitated by the hardware synchronization circuit in the at least one switch and resynchronization of the powered off microcontrollers coupled to the at least one end node can be facilitated by the hardware synchronization circuit in the at least one end node.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
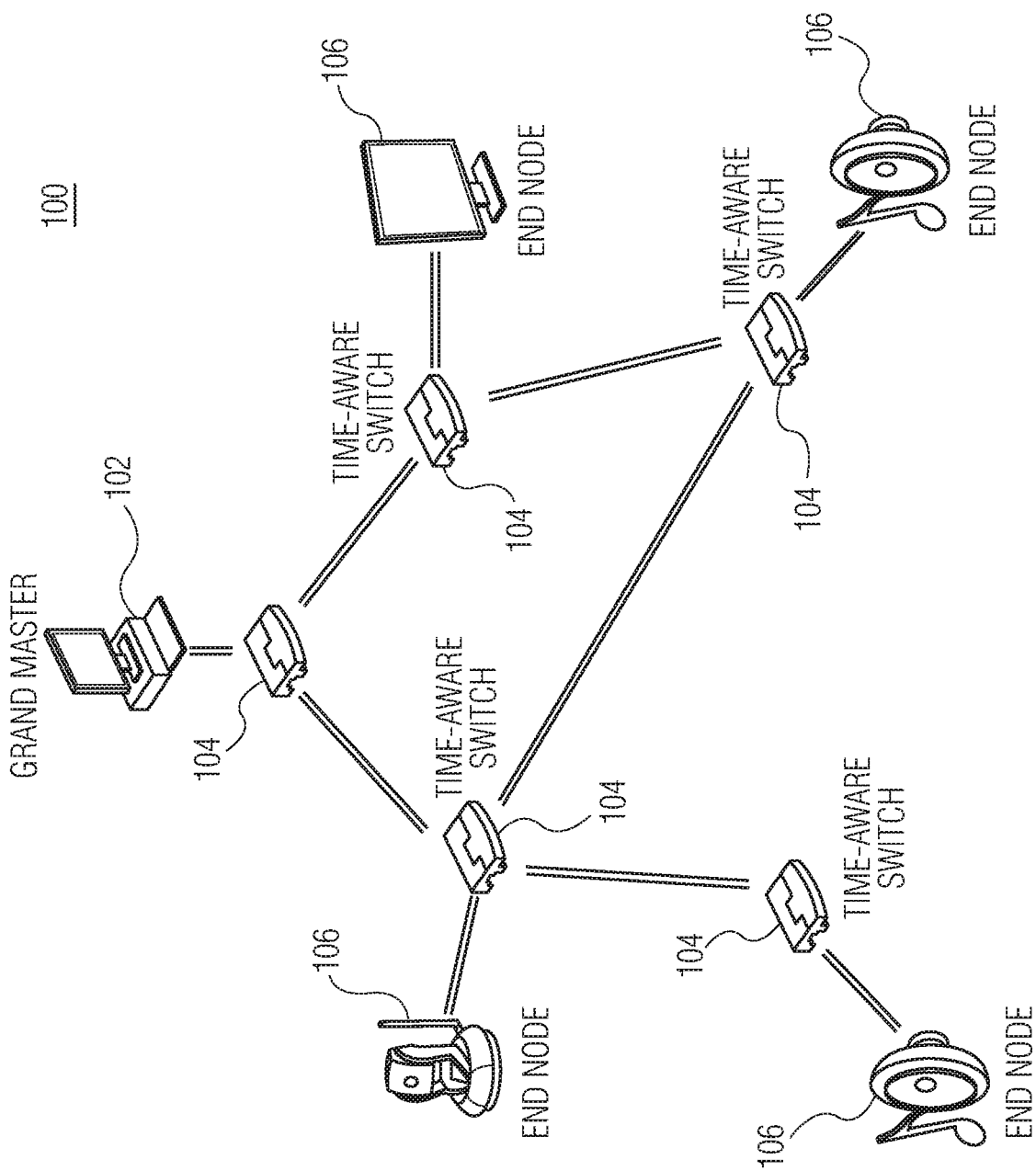
FIG. 1 is an illustration of a network that is configured to use IEEE 802.1AS to enable distributed synchronization.

FIG. 1 is an illustration of a network 100 that is configured to use IEEE 802.1AS to enable distributed synchronization. The network includes a Grand Master 102, time-aware switches 104, and end nodes 106. End nodes can include, for example, a camera, speakers, or video displays. The Grand Master is coupled to a time-aware switch that, in turn, is coupled to several other time-aware switches. Each time-aware switch is coupled to another time-aware switch or to an end node. In other configurations, the Grand Master can be coupled to multiple time-aware switches and multiple end nodes can be coupled to each time-aware switch.

Figure 2:
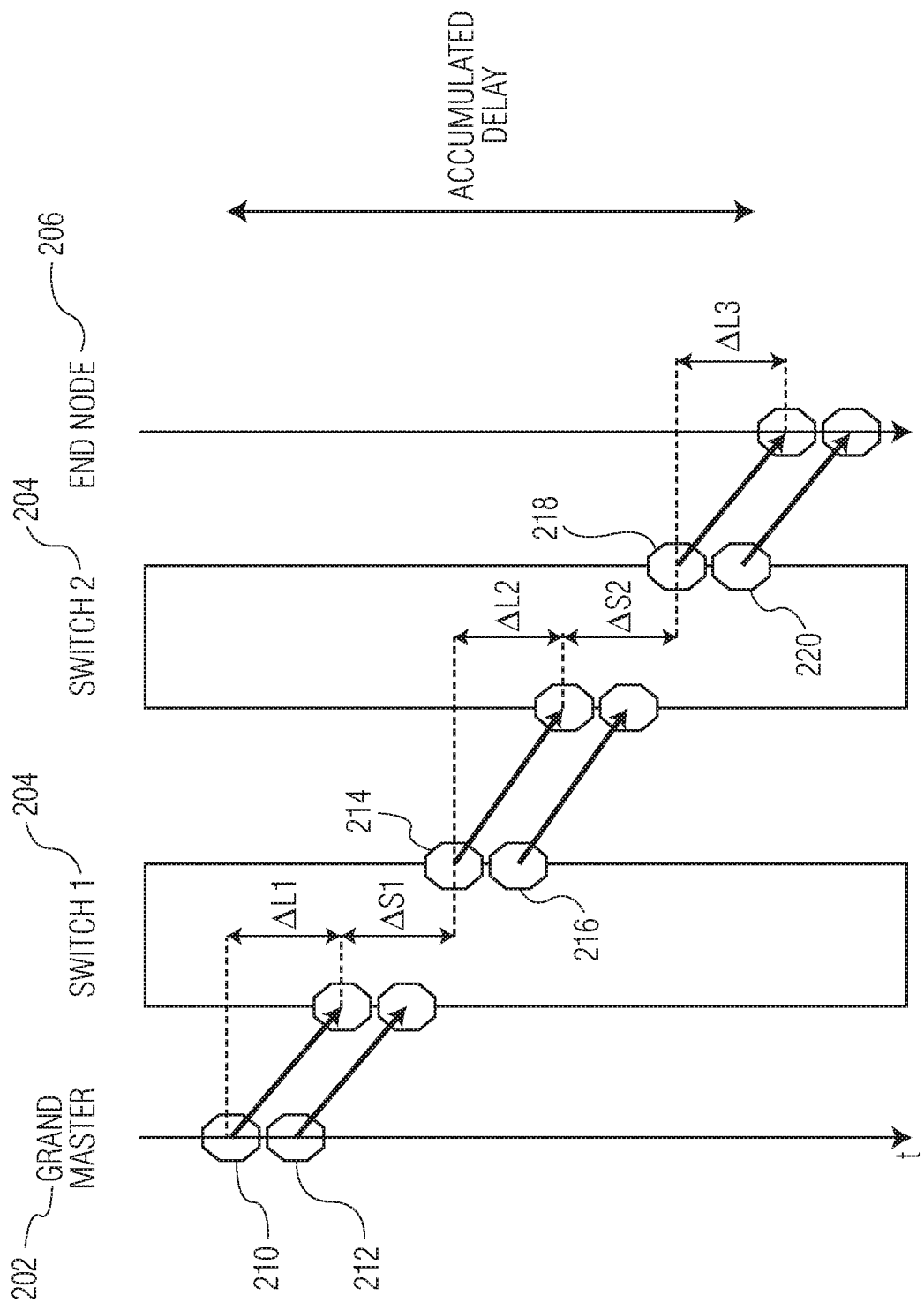
FIG. 2 illustrates the transmission of sync and follow-up frames from a Grand Master to switches and an end node in a network.

In order to maintain synchronization of the end nodes with the Grand Master a synchronization operation is performed. The synchronization operation is performed, in part, by the Grand Master periodically transmitting sync and follow-up frames and, in part, by switches or end nodes computing a local clock time based on information from the follow-up frame and a locally computed network propagation delay. A sync frame can be a minimum-sized frame configured to carry frame type information (e.g., that the frame is a sync frame) without additional information in order to enable quick transmission across a network. FIG. 2 illustrates the transmission of sync and follow-up frames from a Grand Master 202 to switches 204 and an end node 206 in a network. At time 210, a sync frame can be sent from the Grand Master to Switch 1 and, at time 212 a follow-up frame carrying an initial clock time can subsequently be sent. Switch 1 can then compute a local clock time by adding the propagation delay between the Grand Master and Switch 1 to the clock time. Switch 1 can then forward the sync frame to Switch 2 at time 214 and compute a clock time to transmit in a follow-up frame at time 216 to Switch 2. The process can be repeated to send a sync frame to an end node at time 218 and a follow-up frame to the end node at time 220. The clock time to transmit in a follow-up frame can be the local clock time plus the network propagation delay and the residence time. The network propagation delay can be computed from a follow-up frame based on the propagation delay of a frame between two nodes (e.g., the Grand Master and Switch 1), residence time of a frame within a node (e.g., within Switch 1), and a rate ratio between switches or nodes in the network with respect to the Grand Master (e.g., a rate ratio between Switch 1 and End node). While residence time can be easily determined (e.g., transmission time–arrival time of the sync frame), propagation delay and rate ratio are more difficult to determine.

Figure 3:
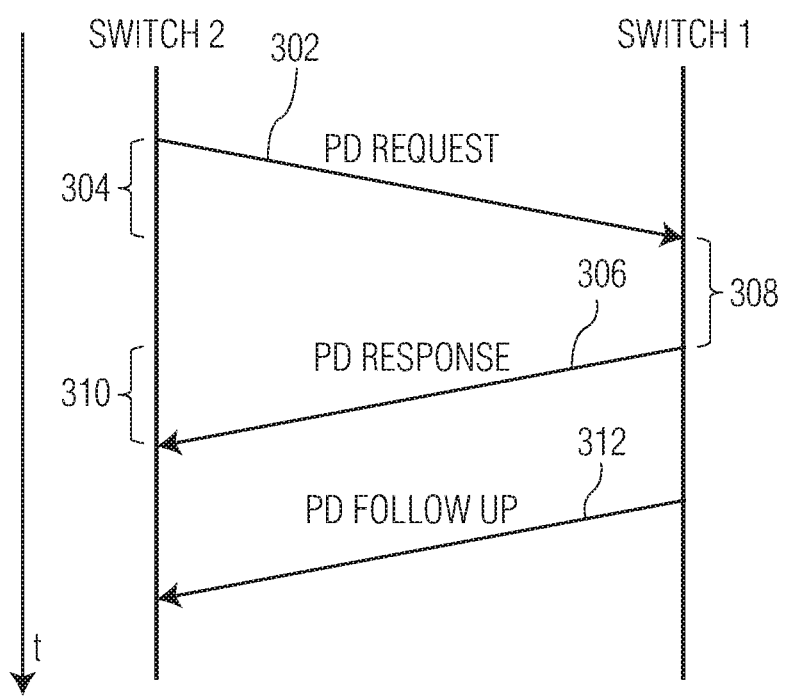
FIG. 3 illustrates an example of the exchange of messages to determine the propagation delay between Switch 1 and Switch 2 of FIG. 2.

In order to determine propagation delay, nodes can periodically exchange messages and perform internal calculations based on the messages. In an embodiment, messages exchanged to determine propagation delay can be exchanged independent of a synchronization operation or during a synchronization operation. In an embodiment where the physical topology of a network does not change over time, propagation delay can be defined as a constant value. FIG. 3 illustrates the exchange of messages to determine the propagation delay between Switch 1 and Switch 2 of FIG. 2. The exchange can begin by a first switch or end node (e.g., "Switch 2") transmitting a first time-stamped message ("PD request") 302 to a second switch or end node (e.g., "Switch 1"). Switch 1 can then transmit a time-stamped message ("PD response") 306 back to Switch 2 along with the amount of time between receiving the message from Switch 2 and sending the PD response message back (e.g., "residence time") 308. Switch 2 can then calculate the propagation delay 304, 310 associated with packets received from Switch 1 by using the following equation:

$$\text{Propogation Delay} = \frac{([\text{receipt of } PD \text{ response}] - [\text{transmission of } PD \text{ request}]) - ([\text{transmission of } PD \text{ response}] - [\text{receipt of } PD \text{ request}])}{2}$$

where the bracketed events correspond to a time at which the event occurs. In an embodiment, if the time is split into second and nanoseconds, then additional subtractions, additions, and shifts may be required to properly carry any remainder from the seconds calculation to the nanoseconds calculation. Switch 1 can then transmit a PD follow-up message 312 to Switch 2 to update Switch 2 on the propagation delay associated with packets received from Switch 2 by Switch 1.

The neighbor rate ration (NRR) and the rate ratio for switches or nodes in the network can be determined at fixed intervals using the following equations:

$$\text{Neighbor Rate Ratio (for Switch 1)} = \frac{[\text{time when } PD \text{ follow-up message is sent}] - [\text{time when } PD \text{ response is sent}]}{[\text{time when } PD \text{ follow-up is received}] - [\text{time when } PD \text{ response is received}]}$$

$$\text{Rate Ratio} = [\text{Current Rate Ratio}] + (NRR - 1)$$

Figure 4:
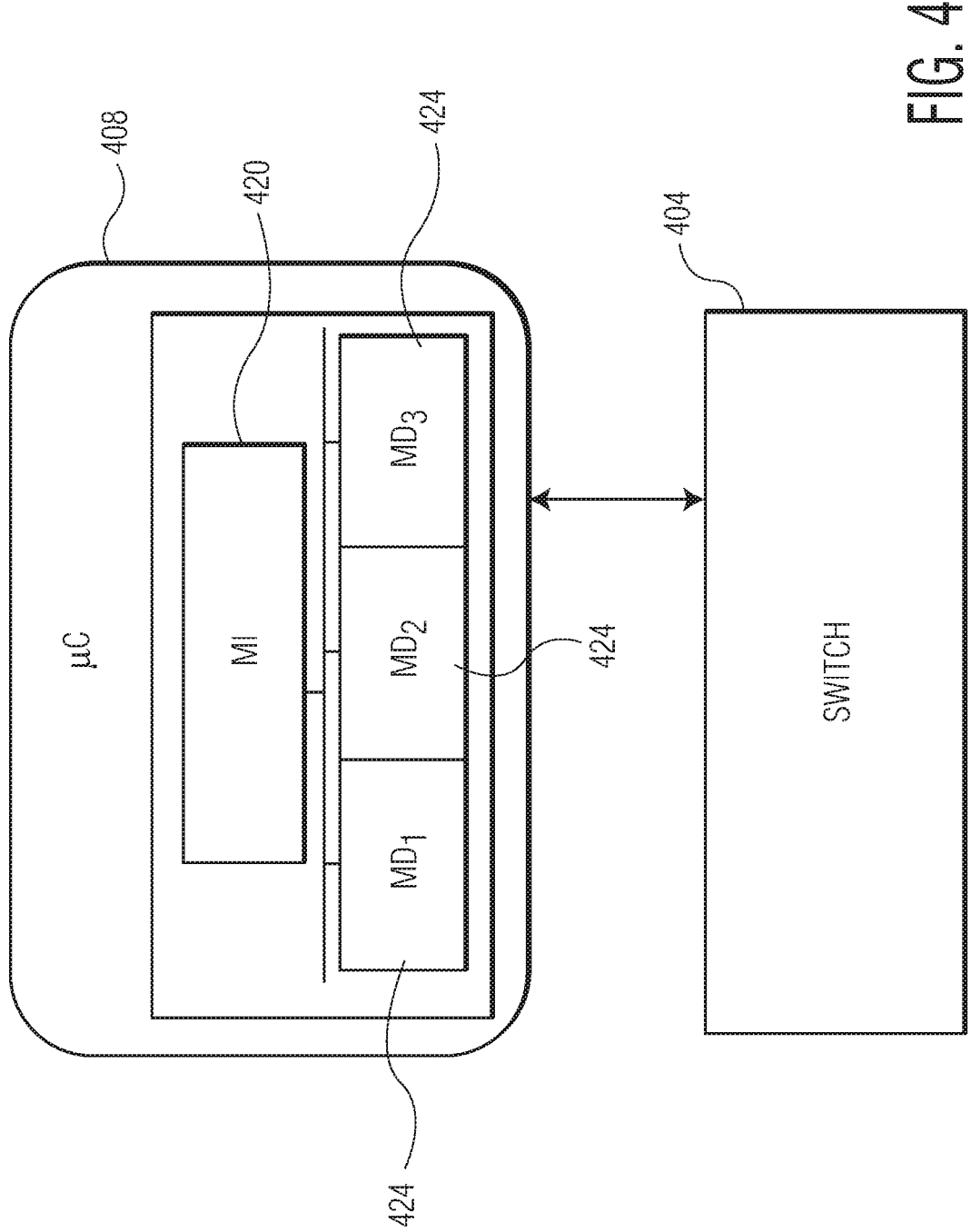
FIG. 4 is a block diagram of a microcontroller connected to a switch, the microcontroller configured to process IEEE 802.1AS frames.

Typically, the calculations and forwarding described with respect to FIGS. 2 and 3 are performed via software executed by a microcontroller. FIG. 4 is a block diagram of a microcontroller 408 connected to a switch 404, the microcontroller configured to process IEEE 802.1AS frames. As illustrated, the microcontroller includes a media-independent peripheral ("MI") 420 and a media-dependent peripheral ("MD") 424. In an embodiment, the media-independent peripheral is configured to compute switch-wide configurations and functions, which are then broadcast to local ports and peer switches. Switch-wide configurations and functions include, for example residence time calculation, frame forwarding, rate ratio calculation (between the Grand Master and the switch), and clock synchronization. The media-dependent peripherals can be configured specific to a single port on the switch and can compute per-port functions, which are shared with the media-independent peripheral. Per-port functions include, for example, rate ratio calculation (between the switch and peer switches), timestamping of the frame (e.g., for use in performing residence time and rate ratio calculations), and link delay calculations. The two peripherals along with other elements of the microcontroller execute software to perform calculations and forwarding operations according to the IEEE 802.1AS standard. Typically, the microcontroller is associated with a single switch and is configured to perform the calculations for the single switch, but other configurations are permitted. For example, a single microcontroller can be associated with several switches chained together, which can increase the computational load and power consumption of the microcontroller.

Distributed synchronization networks employing switches and microcontrollers can be utilized in many different applications. For example, devices in an automobile connected via a local Ethernet network may require synchronization due to timing needs (e.g., a back-up cam must show live image) and/or reliability (e.g., a blind spot sensor must be accurate). In some of these applications it can be beneficial to reduce power consumption by one or more microcontrollers and/or switches (e.g., to reduce fuel and/or battery consumption in an automobile). In order to reduce power consumption, one or more microcontrollers and/or switches can be powered down (e.g., placed in sleep mode, placed in a mode in which the microcontroller stops listening to or receiving frames, or placed in another power state with reduced power consumption and reduced functionality). However, since IEEE 802.1AS requires constant processing of synchronization and PD frames (e.g., a frame including a timestamp from the Grand Master and the previously calculated delays), powering down of a microcontroller can disrupt the distributed synchronization for the associated end nodes or switches. When a microcontroller powers back up, the microcontroller waits until it has synced its local clock before performing further operations, which can delay operation of the end nodes or switches associated with the microcontroller. To expedite the power-up process, the Grand Master can increase the rate at which synchronization and PD frames are generated and sent across the network, but at the cost of adding additional load to the network, which can also delay operations. Thus, powering down a microcontroller and/or switch can result in a delay of operations within the network.

In accordance with an embodiment of the invention, IEEE 802.1AS operations can be performed by hardware components within a switch or within an end node. In an embodiment, an integrated circuit (IC) device is disclosed. In the embodiment, the IC device includes an Ethernet frame processor, at least one Ethernet port coupled to the Ethernet frame processor, and a hardware synchronization circuit coupled to the Ethernet frame processor and to the at least one Ethernet port, the hardware synchronization circuit including a controller, a local clock, a media-independent peripheral coupled to the controller, and a media-dependent peripheral coupled to the media-independent peripheral, wherein power can be provided to the hardware synchronization circuit independent of the Ethernet frame processor. In an embodiment, the IC device can be included in a switch having multiple Ethernet ports or an end node having only one Ethernet port. Some or all of the calculations and operations described above with respect to FIGS. 2 and 3 can be performed by the hardware synchronization circuit. Because power can be provided to the hardware synchronization circuit independent of the Ethernet frame processor, the Ethernet frame processor and/or an associated microcontroller can power down without simultaneously powering down the hardware synchronization circuit, which would disrupt synchronization. When the Ethernet frame processor and/or associated microcontroller are powered down, power typically needed by the Ethernet frame processor and/or associated microcontroller can be conserved and fuel and/or battery usage can be reduced, while synchronization can be maintained.

Figure 5:
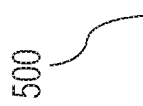
FIG. 5 is a table that indicates where IEEE 802.1AS functions can be performed for several embodiments of the invention.

In order to achieve various power states, combinations of the functions described in FIGS. 2 and 3 can be performed in hardware or software. FIG. 5 is a table 500 that indicates where IEEE 802.1AS functions can be performed for several embodiments of the invention. As indicated in the table, the IEEE 802.1AS functions that can be performed in hardware or software include frame timestamping, residence time calculation, propagation delay calculation, rate ratio calculation, neighbor rate ratio calculation, and clock synchronization. To perform an IEEE 802.1AS function in software, a microcontroller may be powered on to perform the function. To perform a function in hardware, additional hardware components (e.g., registers or adders) may be required. In the embodiment 1 of FIG. 5, power is maximally conserved and all functions are performed in hardware, while in a second and third embodiment the functions are performed in a combination of hardware and software. The performance of a function in hardware conserves power because a microcontroller is not needed. However, more hardware components may be required, which may cause the embodiment to occupy a larger hardware footprint. Accordingly, the motivation to perform a function in hardware or software is a cost benefit analysis of power reduction versus hardware footprint.

Performing the IEEE 802.1AS functions in hardware by a hardware synchronization circuit rather than in software creates several challenges. For example, IEEE 802.1AS functions use double-type integers to perform frame timestamping and to calculate, for example, residence time and propagation delay. In hardware, double-type values are handled by a custom data format. In an embodiment, the custom data format allocates the first 4 bits of a 64-bit register located in the hardware synchronization circuit to an integer value and the trailing 60 bits to a fractional value. Relatedly, clock synchronization (e.g., synchronization of the local clock) can be performed using separate adders and subtractors to detect and compute seconds and nanoseconds separately. That is, a first set of adders and subtractors can be configured to update seconds, while a second set of adders and subtractors can be configured to update nanoseconds of the local clock. In an embodiment, frame timestamping can be performed by storing values corresponding to a timestamp in std_logic_vector. The residence time function and propagation delay function can be performed by subtractors in the hardware synchronization circuit. For example, residence time can be calculated by subtracting a value corresponding to a timestamp of the receipt of a synchronization frame stored in a first register (e.g., the arrival time of a frame) from a value corresponding to the forwarding of the synchronization frame (e.g., the forwarding time of a frame) as follows:

RESIDENCE TIME=FORWARDING TIME−ARRIVAL TIME

Figure 6:
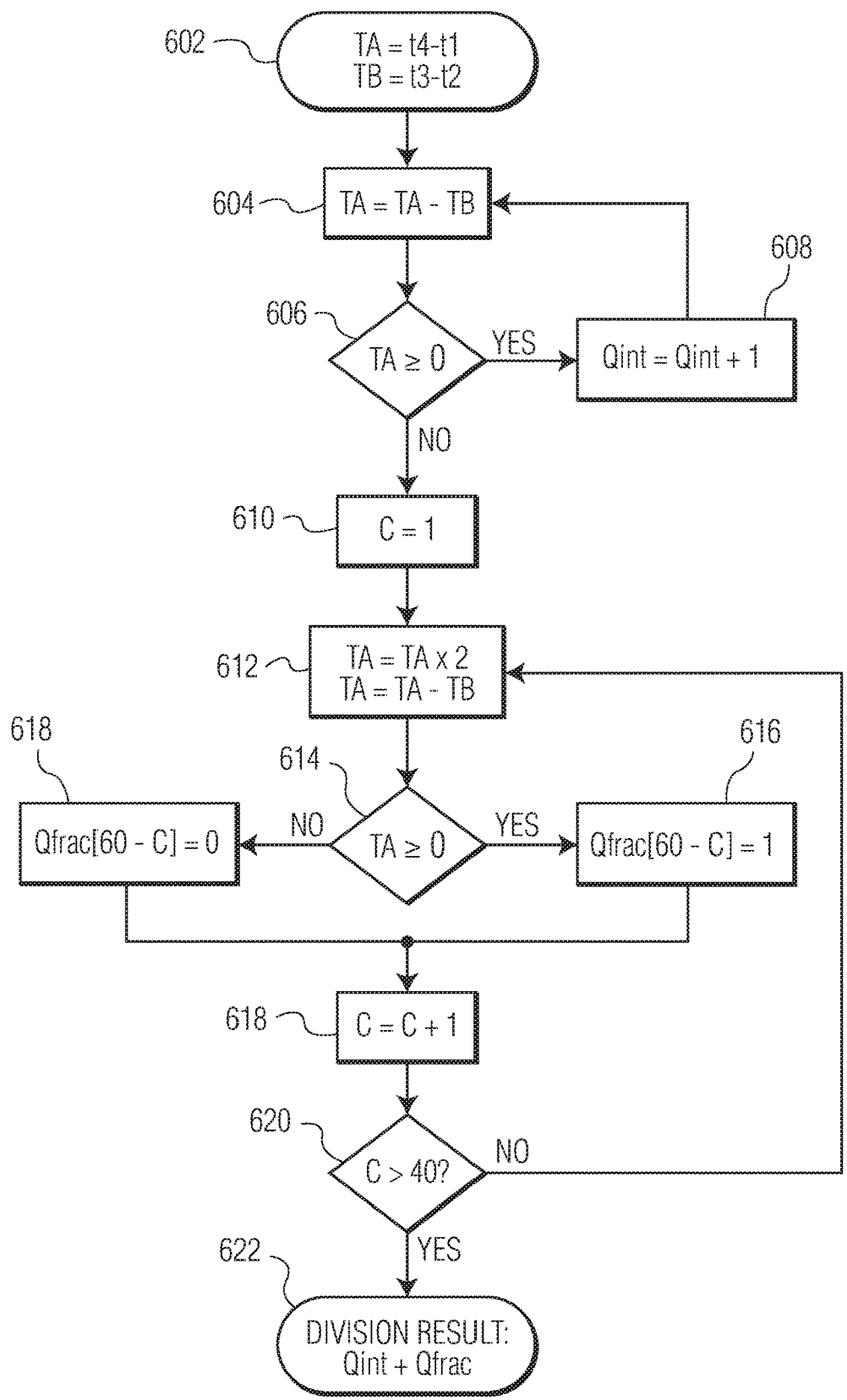
FIG. 6 is a flow chart diagram of an embodiment of a non-restoring division algorithm implemented via iterative subtraction and shifting operations using registers in a hardware synchronization circuit in accordance with an embodiment of the invention.

Propagation delay can be calculated as described above with respect to FIG. 3. A rate ratio (the difference in clock rates between the Grand Master and a switch or an end node) function and a neighbor rate ratio (the difference in clock rates between a switch and a peer switch) function can be calculated using a non-restoring division algorithm as described above with respect to the FIG. 3. The non-restoring division algorithm can be implemented via iterative subtraction and shifting operations using registers in the hardware synchronization circuit. FIG. 6 is a flow chart diagram of an embodiment of a non-restoring division algorithm implemented via iterative subtraction and shifting operation using registers in a hardware synchronization circuit in accordance with an embodiment of the invention. In the flow chart diagram, "t4" corresponds to a time at which a PD follow-up message (e.g., the PD follow-up message described with reference to FIG. 3) is received, "t1" corresponds to a time at which a PD response message (e.g., the PD response message described with reference to FIG. 3) is sent, "t3" corresponds to a time at which the PD follow-up message is sent, and "t2" corresponds to a time at which the PD response message is received. At block 602, TA is defined as t4−t1 and TB is defined as t3−t2. In order to determine a double-type integer value for the neighbor rate ratio (NRR), at block 604, TB is subtracted from TA and, while TA is determined to not be equal to or less than zero at decision point 606, the variable holding the integer value for the NRR is increased by one at block 608. Once TA drops to or below zero, at block 610, a constant variable C is set to one. At block 612, TA is doubled and TB is subtracted. At decision point 614, if TA is determined to be greater than zero, at block 616, a bit at register Qfrac[59] is set to one, else, at block 618, the bit is set to zero. At block 618, C is incremented by one and, at decision point 620, if C is equal to or less than forty, the process returns to block 612 to determine the value for a bit at register Qfrac[58]. The process is repeated until C is greater than forty and then, at block 622, the integer value and the fractional value are added together to produce a value representing the double-type value equal to the NRR.

Figure 7A:
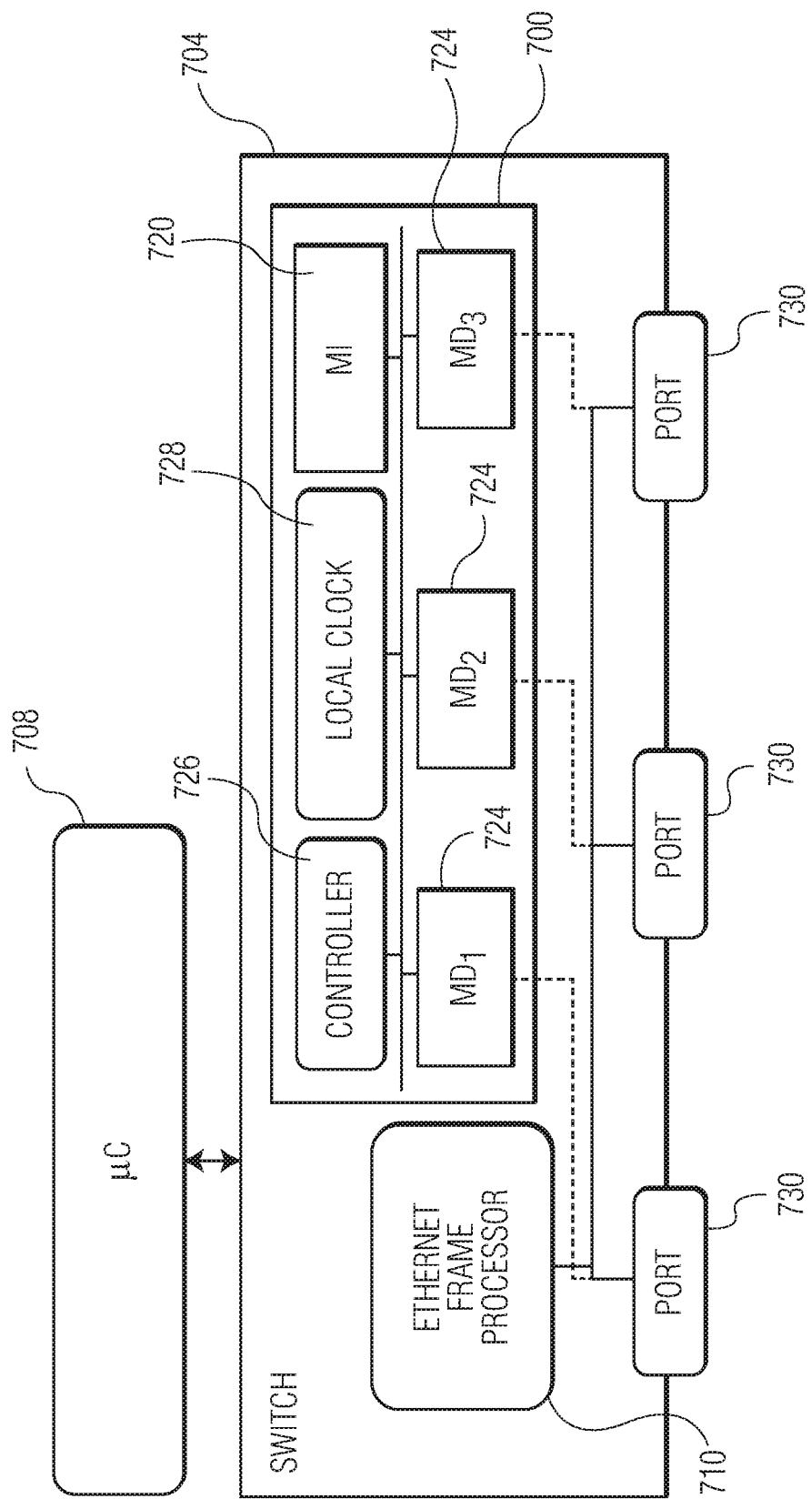
FIGS. 7A-7C are exemplary embodiments of a hardware synchronization circuit implemented for a switch and configured to process IEEE 802.1AS frames in accordance with an embodiment of the invention.

In an embodiment, the hardware synchronization circuit can be implemented for a switch or for an end node. FIG. 7A is an exemplary embodiment of a hardware synchronization circuit 700 implemented for a switch 704 and configured to process IEEE 802.1AS frames in accordance with an embodiment of the invention. As illustrated, the switch is coupled to a microcontroller 708. The switch includes an Ethernet frame processor 710 (e.g., a packet processor in a switch chip or a signal processor in a PHY) and the hardware synchronization circuit coupled to the Ethernet frame processor. The hardware synchronization circuit includes a controller 726, a local clock 728, a media-independent peripheral ("MI") 720, and a unique media-dependent peripheral ("MD") 724 coupled to each port 730 of the switch. As illustrated, one-to-one coupling between a unique media-dependent peripheral and a port is indicated by a dotted line. A port can be a physical or a virtual data-link port, such as an Ethernet port, that interconnects with a media access control (MAC) sublayer via the physical signaling sublayer of the OSI model of computer networking. In an embodiment, the controller, local clock, media-independent peripheral, and media-dependent peripheral can be implemented using registers, adders, and subtractors in the digital circuitry of a switch or an Ethernet PHY. The controller can be configured as a centralized module (e.g., implemented fully within the hardware synchronization circuit) that manages operations of the hardware synchronization circuit such as, for example, storing and handling switch information such as port roles, Grand Master identity, initialization signals, or a clock identity ID. The controller can also be configured to assign identities to each port of a switch, initialize ports according to their specific role, and to utilize fixed parameters in the initialization process (e.g., time intervals, timeout time, etc.) For example, a slave port can be initialized to receive synchronization frames, but to timeout after a timeout time has expired with no receipt of a synchronization frame. The local clock can be implemented via registers and adders configured to generate synchronization ticks and to store a local synchronized time. As illustrated, IEEE 802.1AS functions can be allocated for performance in software or hardware similarly to embodiment 1 of FIG. 5.

Figure 7B:
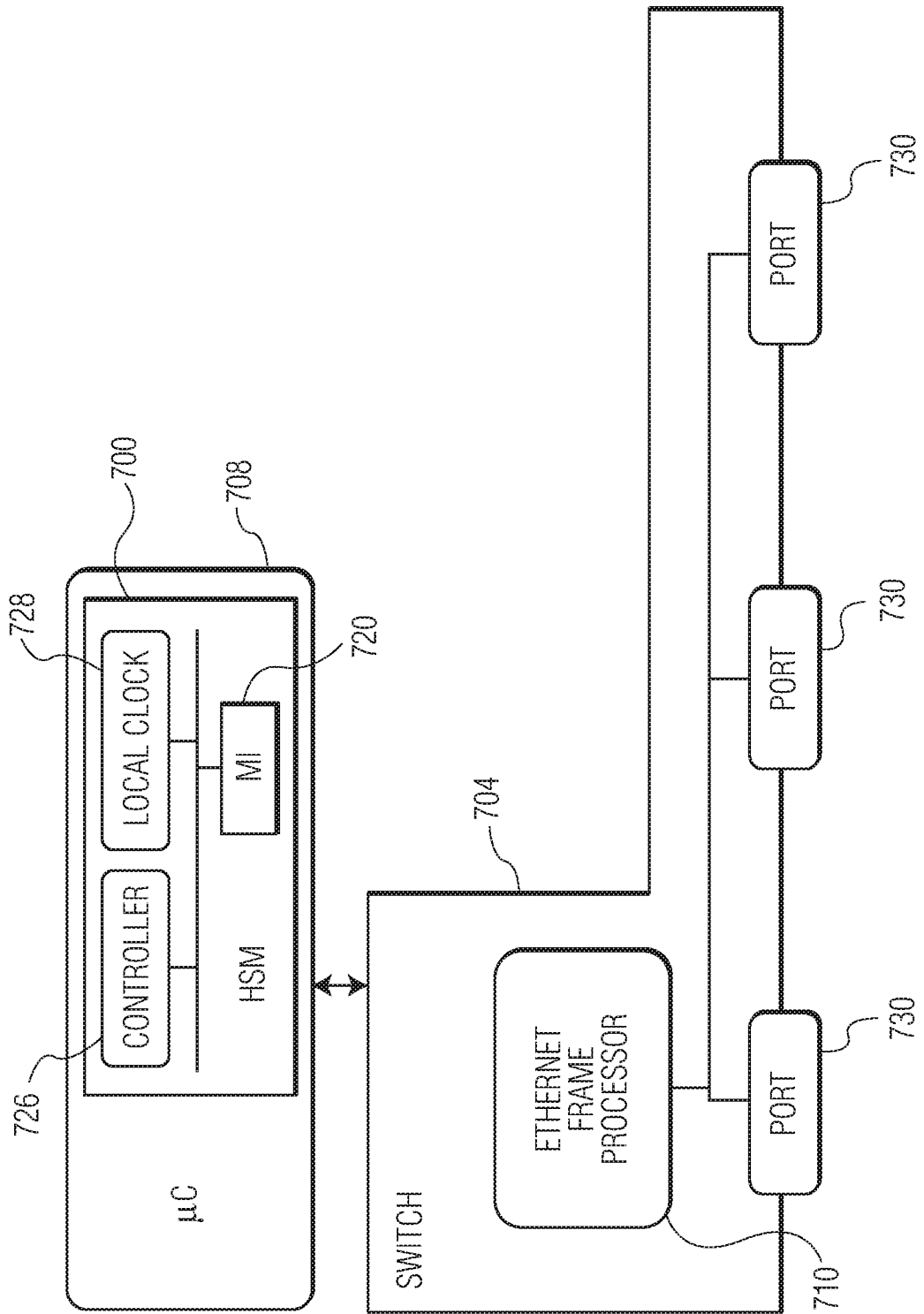

FIG. 7B is an alternative exemplary embodiment of a hardware synchronization circuit 700 implemented for a switch 704 and configured to process IEEE 802.1AS frames in accordance with an embodiment of the invention. As illustrated, the switch is coupled to a microcontroller 708 and the hardware synchronization circuit is implemented within the microcontroller. With the illustrated implementation, IEEE 802.1AS functions can be allocated to software or hardware for performance similarly to the allocation described with reference to embodiment 2 of FIG. 5. Thus, although some functions will still be performed by the microcontroller, the power demand will be reduced because some functions (e.g., time-stamping, residence time calculation, and propagation delay calculation) can be performed by the hardware synchronization circuit. Additionally, the size of the hardware synchronization circuit can be reduced because additional hardware components needed to perform the IEEE 802.1AS function in software by the microcontroller may not be needed.

Figure 7C:
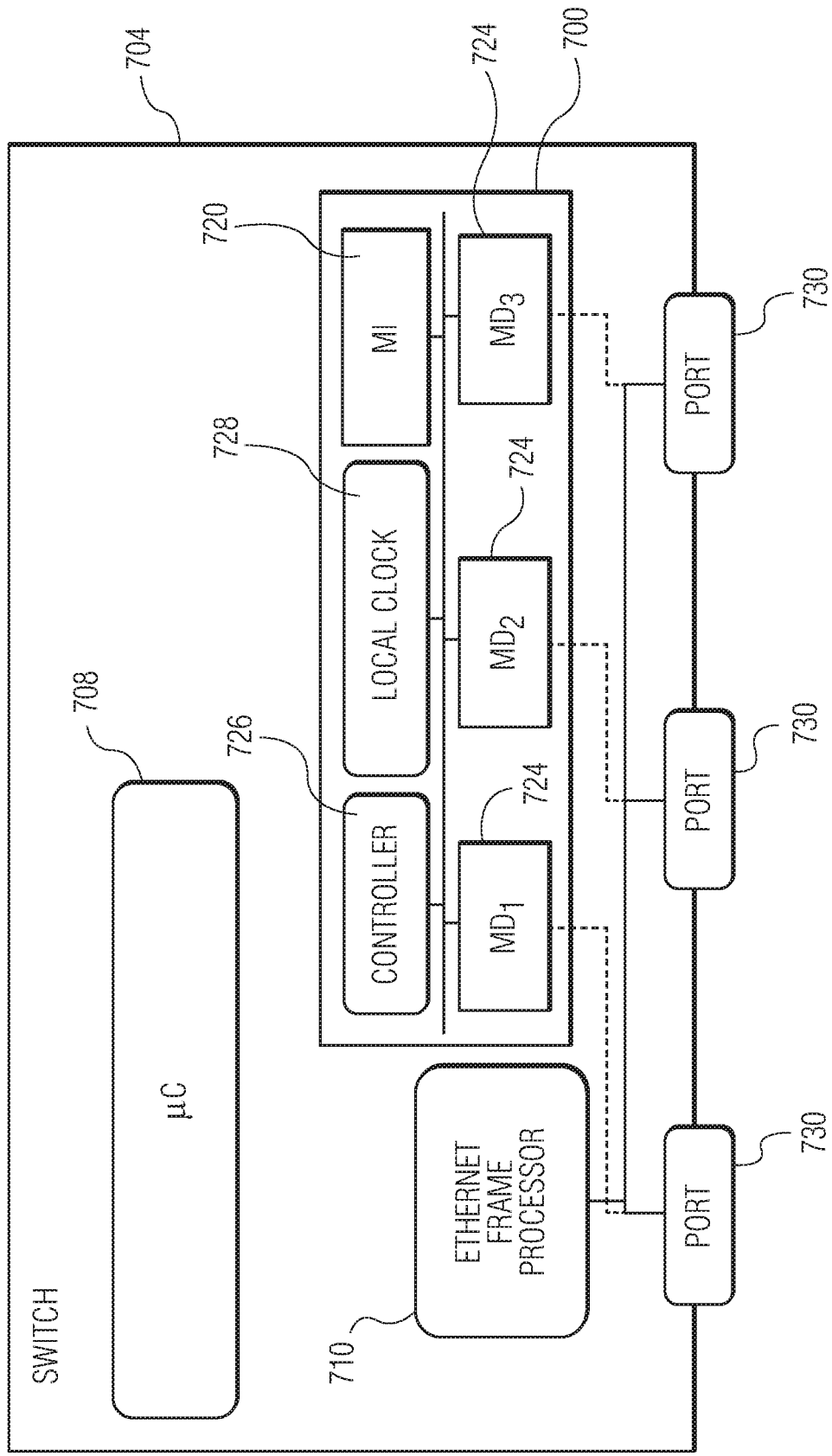

FIG. 7C is an alternative exemplary embodiment of a hardware synchronization circuit 700 implemented for a switch 704 and configured to process IEEE 802.1AS frames in accordance with an embodiment of the invention. As illustrated, a microcontroller 708 can be integrated into a switch. So configured, functions can be allocated to hardware or software for performance similarly to the allocation described with reference to embodiment 3 of FIG. 5. The microcontroller may not be fully powered-down, but most IEEE 802.1AS functions can be performed in the hardware synchronization circuit, which decreases the power demanded by the microcontroller to perform the remaining IEEE 802.1AS functions.

Figure 8A:
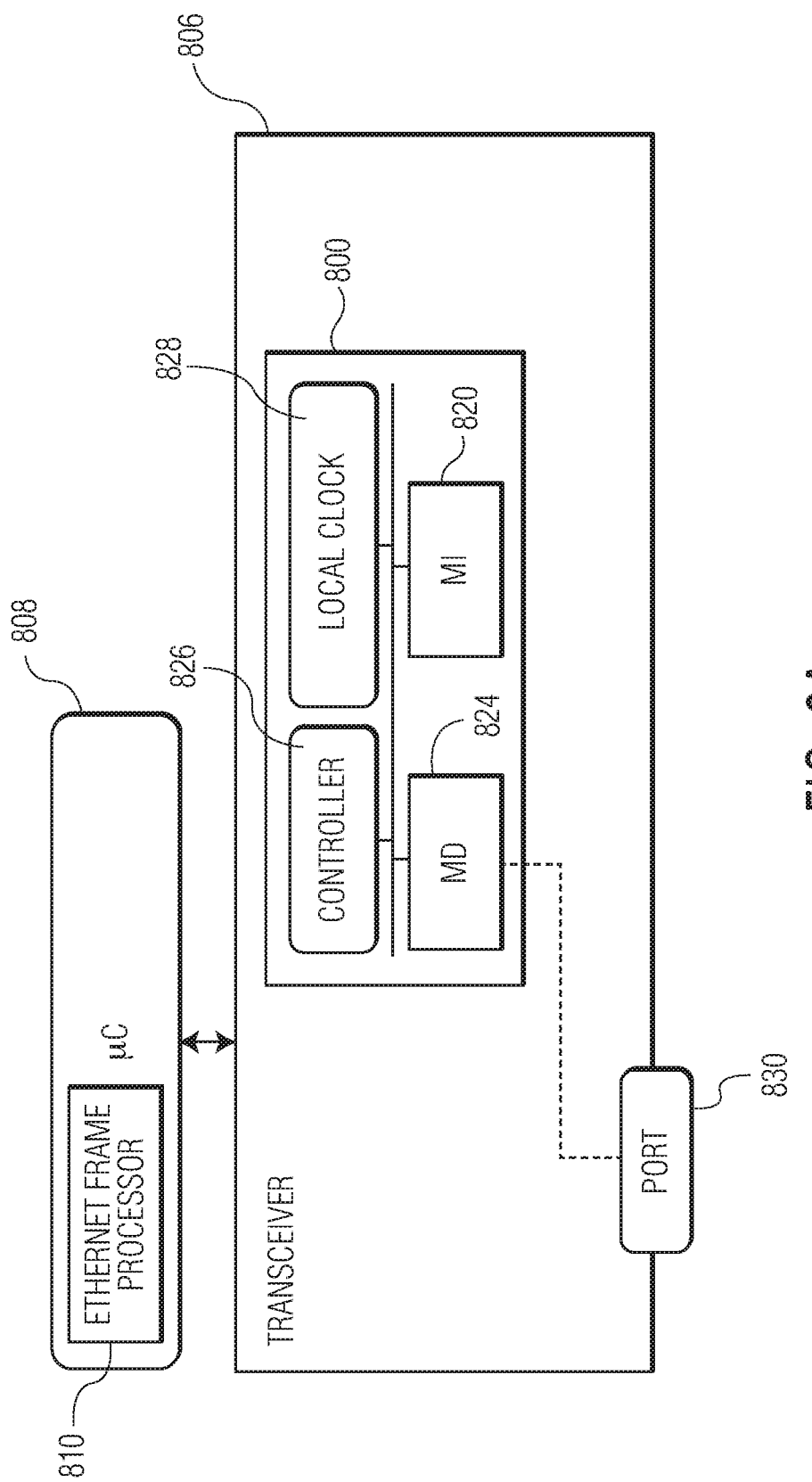
FIGS. 8A-8C are exemplary embodiments of a hardware synchronization circuit implemented for an end node and configured to process IEEE 802.1AS frames in accordance with an embodiment of the invention.

FIG. 8A is an exemplary embodiment of a hardware synchronization circuit 800 implemented for an end node 804 and configured to process IEEE 802.1AS frames in accordance with an embodiment of the invention. As illustrated, the hardware synchronization circuit is implemented in a transceiver and the transceiver is coupled to a microcontroller 808, the microcontroller including an Ethernet frame processor 810. In an embodiment, the transceiver can be implemented within an end node. Similar to the components described above with reference to FIG. 8A, the hardware synchronization circuit of FIG. 8A includes a controller 826, a local clock 828, a media-independent peripheral 820, and a unique media-dependent peripheral 824 coupled to a port 830 of the transceiver. As illustrated, one-to-one coupling between a unique media-dependent peripheral and the port is indicated by a dotted line. The port can be a physical or a virtual data-link port, such as an Ethernet port, that interconnects with a media access control (MAC) sublayer via the physical signaling sublayer of the OSI model of computer networking. In an embodiment, the controller, local clock, media-independent peripheral, and media-dependent peripheral can be implemented using registers, adders, and subtractors in the digital circuitry of an Ethernet PHY (e.g., within an end node). The controller can be configured as a centralized module (e.g., implemented fully within the hardware synchronization circuit) that manages operations of the hardware synchronization circuit. For example, storing and handling Grand Master identity, initialization signals, or a clock identity ID. The controller can also be configured to assign an identity to the port, initialize a port according to a specific role, and to utilize fixed parameters in the initialization process (e.g., time intervals, timeout time, etc.) For example, a slave port can be initialized to receive synchronization frames, but to timeout after the timeout time has expired with no receipt of a synchronization frame. The local clock can be implemented via registers and adders configured to generate synchronization ticks and to store a local synchronized time. As illustrated, IEEE 802.1AS functions can be allocated for performance in software or hardware similarly to embodiment 1 of FIG. 5.

Figure 8B:
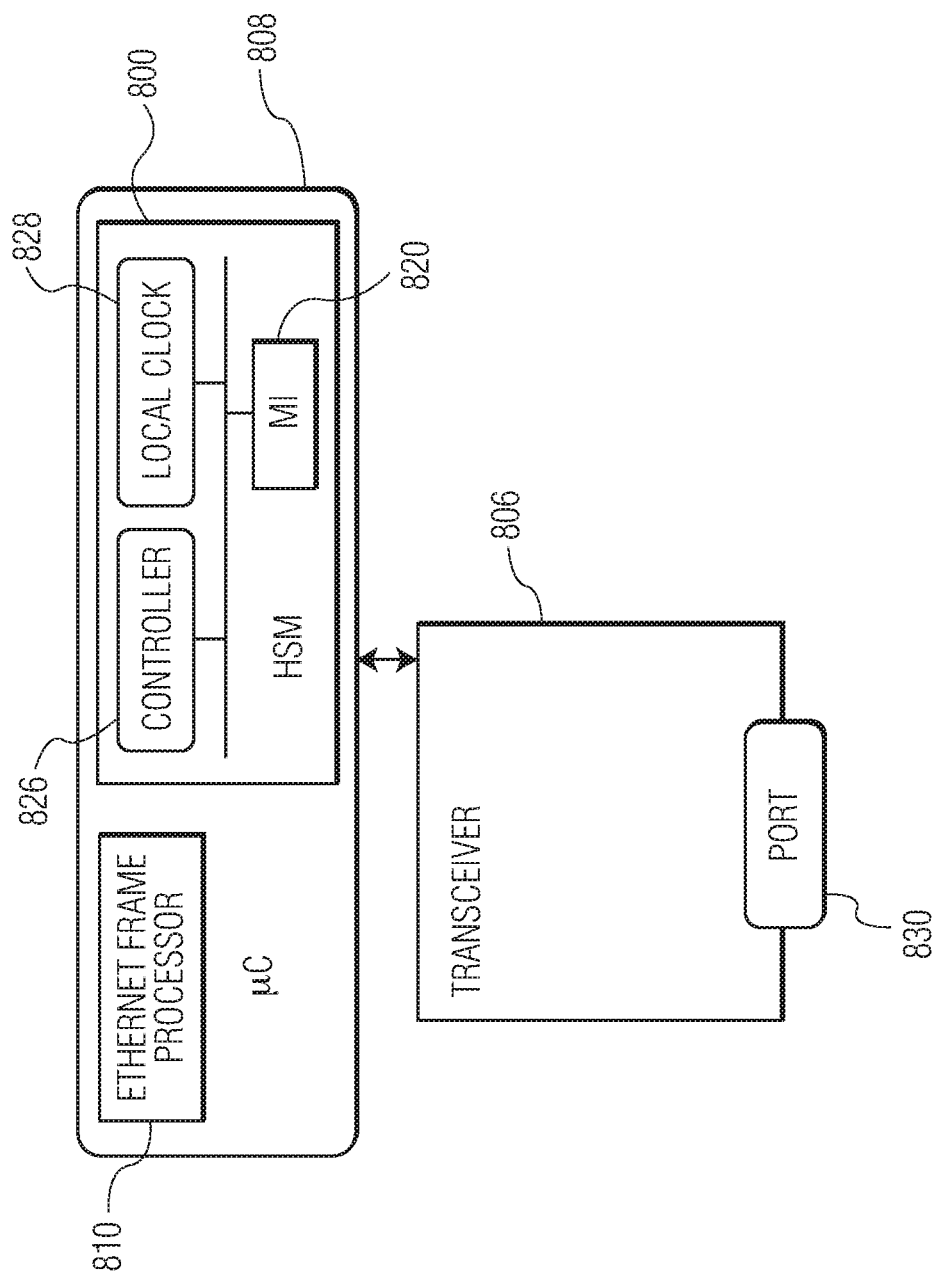

FIG. 8B is an alternative exemplary embodiment of a hardware synchronization circuit 800 implemented for an end node 806 configured to process IEEE 802.1AS frames in accordance with an embodiment of the invention. As illustrated, the transceiver is coupled to a microcontroller 808 including an Ethernet frame processor 810 and the hardware synchronization circuit is implemented within the microcontroller. With the illustrated implementation, IEEE 802.1AS functions can be allocated to software or hardware for performance similarly to the allocation described with reference to embodiment 2 of FIG. 5. Thus, although some functions will still be performed by the microcontroller, the power demand will be reduced because some functions (e.g., time-stamping, residence time calculation, and propagation delay calculation) can be performed by the hardware synchronization circuit. Additionally, the size of the hardware synchronization circuit can be reduced because additional hardware components needed to perform the IEEE 802.1AS function performed in software by the microcontroller may not be needed.

Figure 8C:
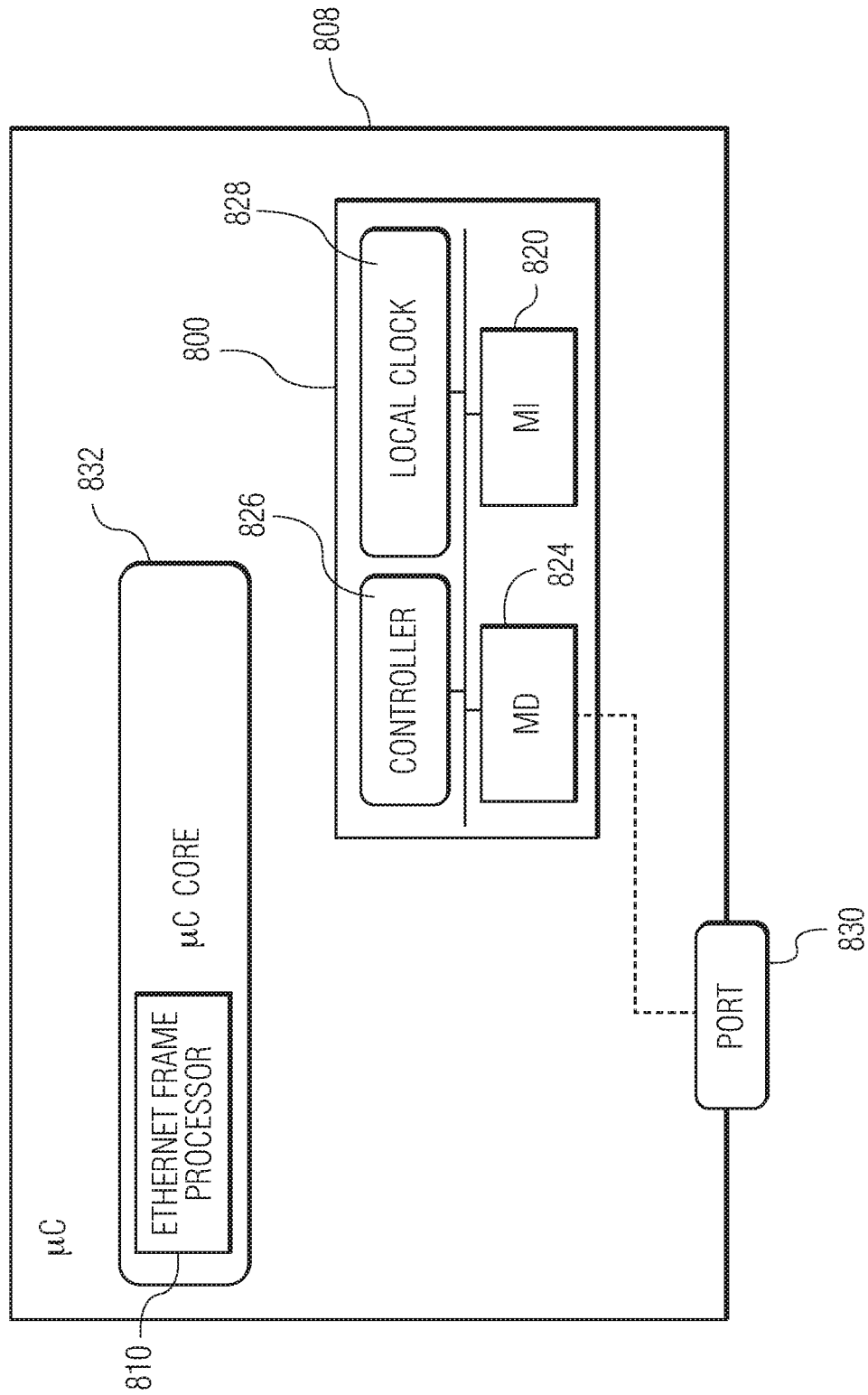

FIG. 8C is an alternative exemplary embodiment of a hardware synchronization circuit 800 implemented for an end node configured to process IEEE 802.1AS frames in accordance with an embodiment of the invention. As illustrated, an end node can be a microcontroller 808 with an integrated transceiver. A microcontroller core 832 implementing functionality of an Ethernet frame processor 810 can be implemented separate from the hardware synchronization circuit and the media-dependent peripheral 824 can be coupled to the port 830 of the microcontroller. So configured, functions can be allocated to hardware or software for performance similarly to the allocation described with reference to embodiment 3 of FIG. 5. The microcontroller may not be fully powered-down, but IEEE 802.1AS functions can be performed in the hardware synchronization circuit, which decreases the power demanded by the microcontroller to perform the remaining IEEE 802.1AS functions.

Figure 9:
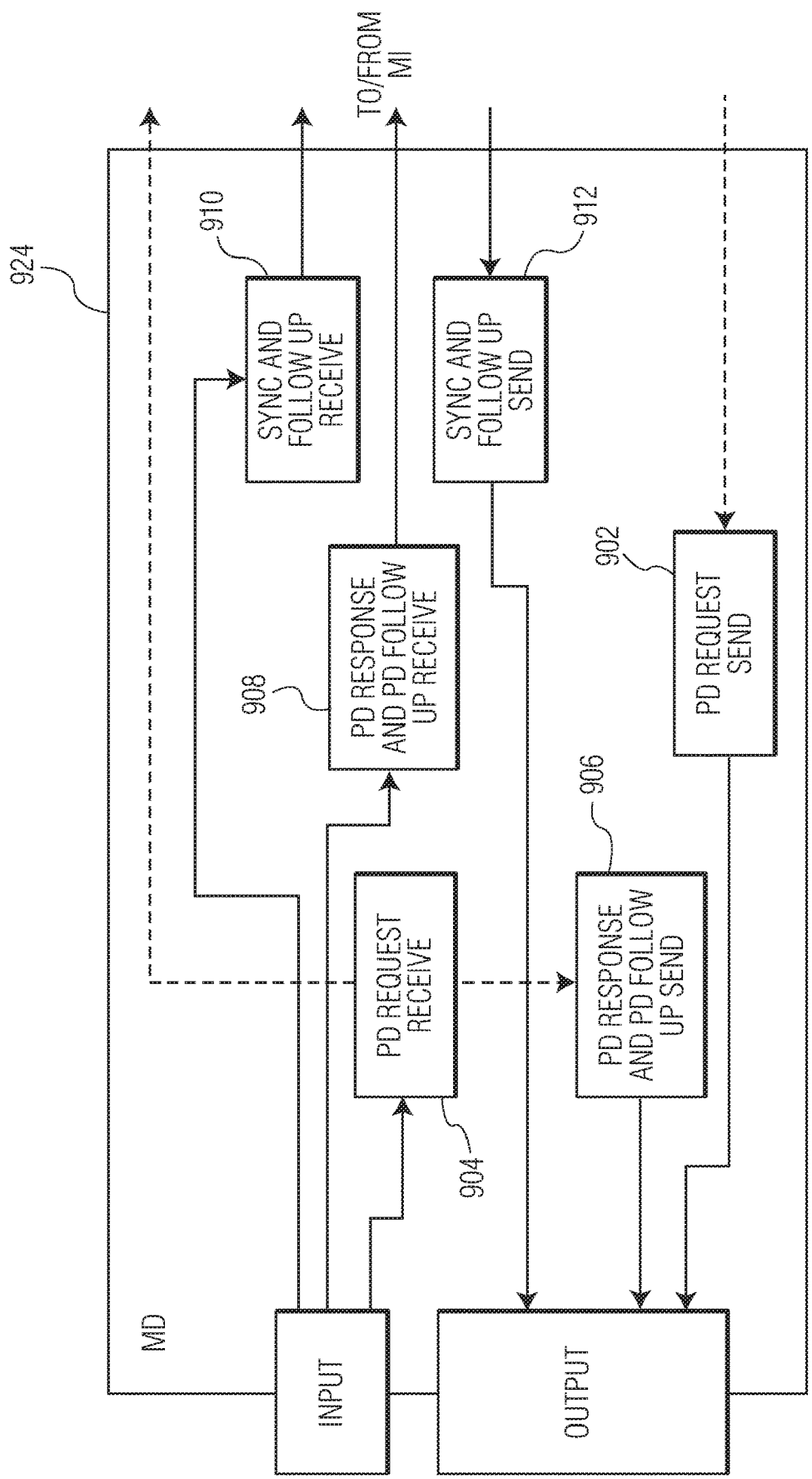
FIG. 9 is a block diagram illustrating the handling and generation of various messages as described above with reference to FIGS. 2 and 3 as performed by a media-dependent peripheral and a media-independent peripheral.

In an embodiment, when IEEE 802.1AS frames are received on a port, the frames are sent to a media-dependent peripheral specific to the port. The media-dependent peripheral computes per-port functions and then forwards the outputs and the frames up to the media-independent peripheral. The media-dependent peripheral can also be configured to process a partial range of header data in the frames and store the data in registers in the hardware synchronization circuit. The partial range can be a range of bits corresponding to information needed for other IEEE 802.1AS functions (e.g., bits 512-1024). FIG. 9 is a block diagram illustrating the handling and generation of various messages as described above with reference to FIGS. 2 and 3 as performed by a media-dependent peripheral 924 and a media-independent peripheral (not shown). When propagation delay or neighbor rate ratio needs to be updated, a PD request message is sent 902. When a PD request message is received 904, the messages are passed to the media-independent peripheral, while a PD response message and PD follow-up message are sent 906. When a PD response message and a PD follow-up message are received 908, the messages are passed to the media-independent peripheral to calculate the propagation delay and neighbor rate ratio from the frames. When a sync and follow up frame is received 910, the frames are passed to the media-independent peripheral to update the local clock. When sync and follow-up frames are returned from the media-independent peripheral after the local clock has been updated, the sync and follow-up frames are sent 912 to another node in the network. The media-dependent peripheral can also be configured to set a link-delay interval, which determines the time interval for the forwarding and transmission of the frames to peer nodes.

Figure 10:
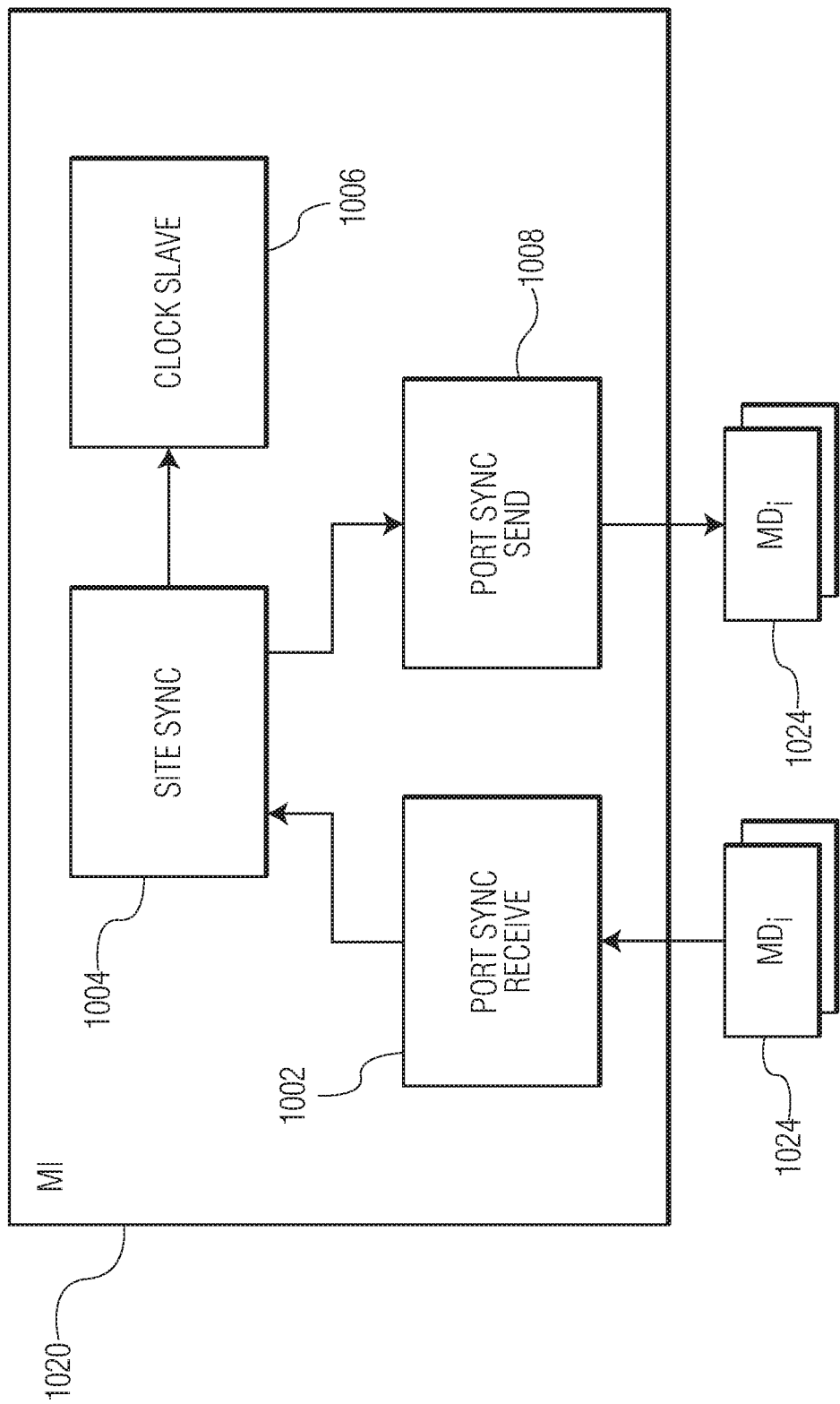
FIG. 10 is a block diagram illustrating the functions performed by a media-independent peripheral.

FIG. 10 is a block diagram illustrating the functions performed by the media-independent peripheral 1020. The blocks indicate functions performed by the media-independent peripheral. When data is received from a media-dependent peripheral 1024, a port sync receive operation 1002 can be performed to parse the data followed by the performance of a site sync operation 1004. The site sync operation can calculate an updated local synchronization time, which can be forwarded along to a clock slave 1006 to update the clock time of the clock slave, can be forwarded back to the media-dependent peripheral using a port synchronization send operation 1008 for forwarding to peer nodes.

By implementing a hardware synchronization circuit including a controller, media-dependent peripherals, and a media-independent peripheral, as described above with reference to FIGS. 7-10, a microcontroller and a switch engine may not be needed to perform IEEE 802.1AS operations. Because the microcontroller and the switch engine may not be needed to perform IEEE 802.1AS operations, such as maintaining synchronization or forwarding frames to other switches and/or end nodes, the microcontroller and switch engine may be powered down to reduce power consumption. Accordingly, even when a microcontroller is powered down, an associated switch can continue to perform synchronization functions without disrupting the distributed synchronization.

Figure 11A:
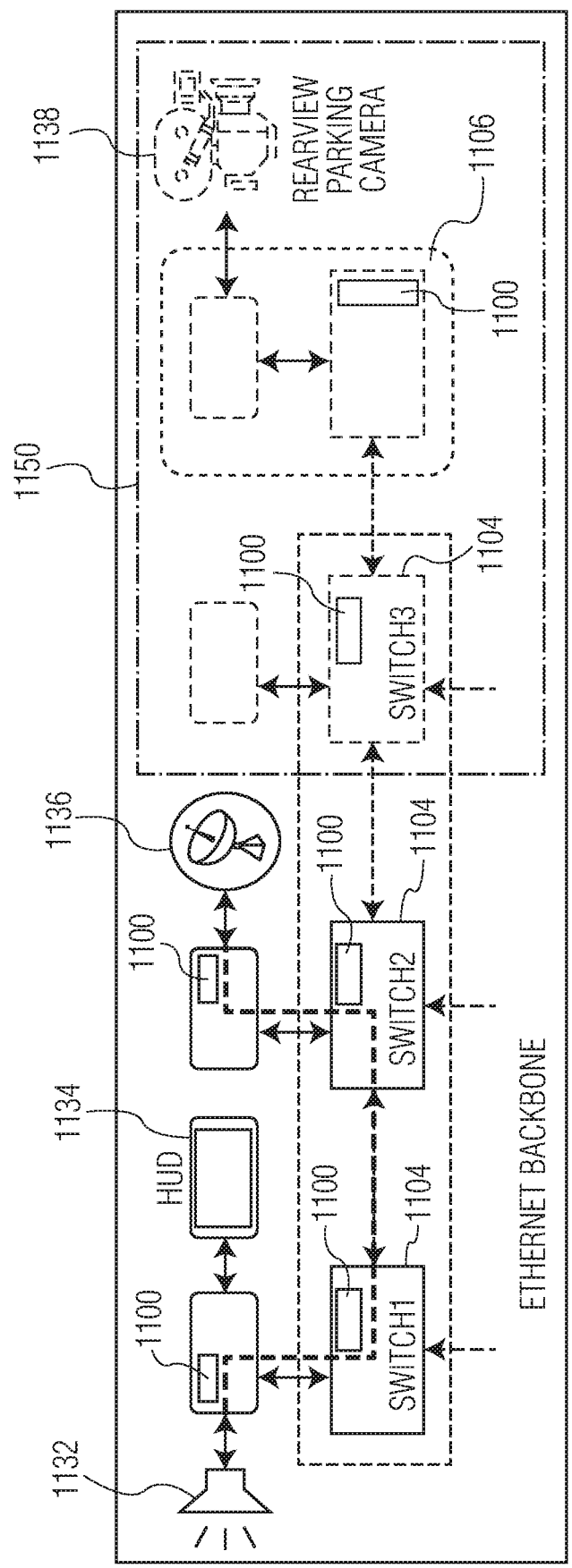
FIGS. 11A and 11B illustrate an example of an Ethernet network in an automobile employing hardware synchronization circuits in accordance with an embodiment of the invention.
Figure 11B:
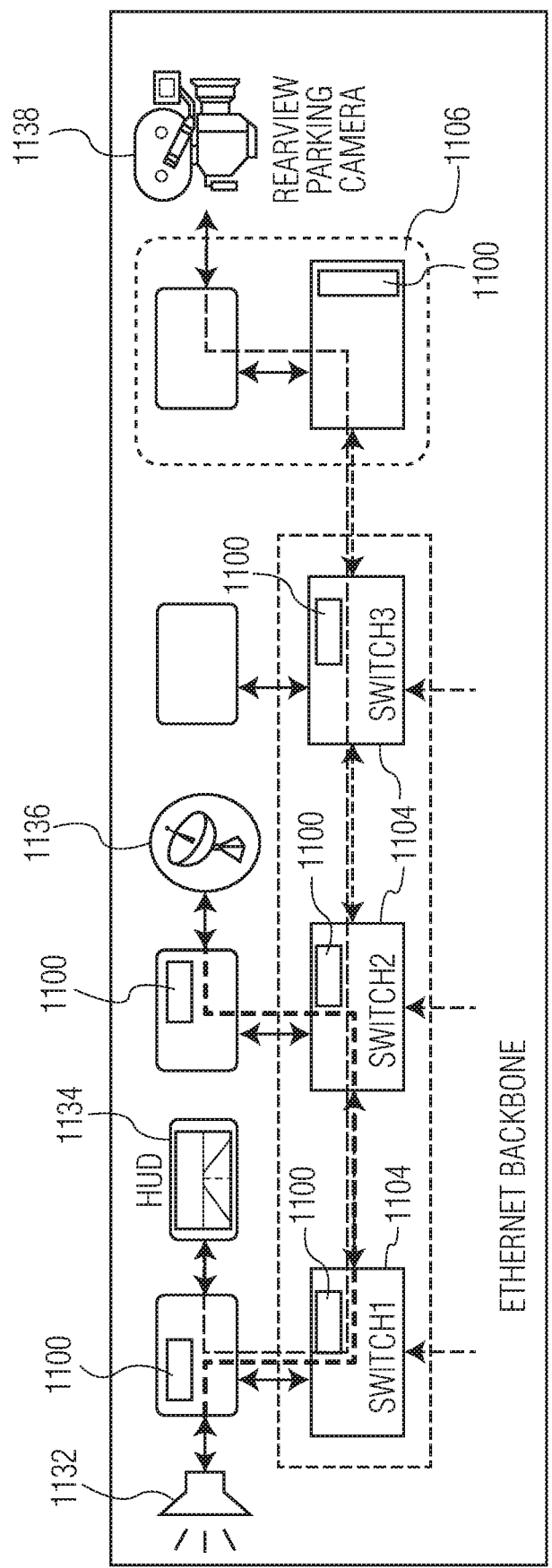

FIGS. 11A and 11B illustrate an example of an Ethernet network in an automobile employing hardware synchronization circuits in accordance with an embodiment of the invention. In FIG. 11A, the Ethernet network includes an audio system 1132 and a heads-up display (HUD) 1134 coupled to a first switch 1104 via a microcontroller, an antenna 1136 coupled to a second switch 1104 via a microcontroller, a third switch 1104 coupled to a microcontroller, and a rearview parking camera 1138 coupled to an end node 1106. The switches and the end node are each configured with hardware synchronization circuits 1100. Initially, the audio system is in a partially powered state (e.g., the HUD is powered down as indicated by a blank screen) and the antenna is in a powered up state, while the switch, end node, and rearview parking camera inside box 1150 are powered down, as indicated by the dotted outlines. Box 1150 is shown merely for illustrative purposes and does not correspond to a physical element of an Ethernet network. Switch 1 and Switch 2 are needed to facilitate the audio system, but Switch 3 and the end node are not needed and can be powered down. Synchronization for Switch 3 and the end node can be maintained by the corresponding hardware synchronization circuits 1100, as indicated by the solid outlines. When a driver shifts the automobile into reverse, Switch 3 and the end node power up and resynchronize as illustrated in FIG. 11B. Because the hardware synchronization circuits of Switch 3 and the end node have maintained synchronization while Switch 3 and the end node remained powered down, the resynchronization can occur much more quickly than if the corresponding microcontrollers had to wait for the Grand Master to send synchronization frames and for a local clock time to be updated. Thus, power can be conserved while quick initialization of network nodes when powering back up is also possible. Additionally, an additional burst of synchronization frames across a network to converge Switch 3 with the Grand Master may not be required and the network can continue normal operation with being subjected to additional data traffic.

Figure 12:
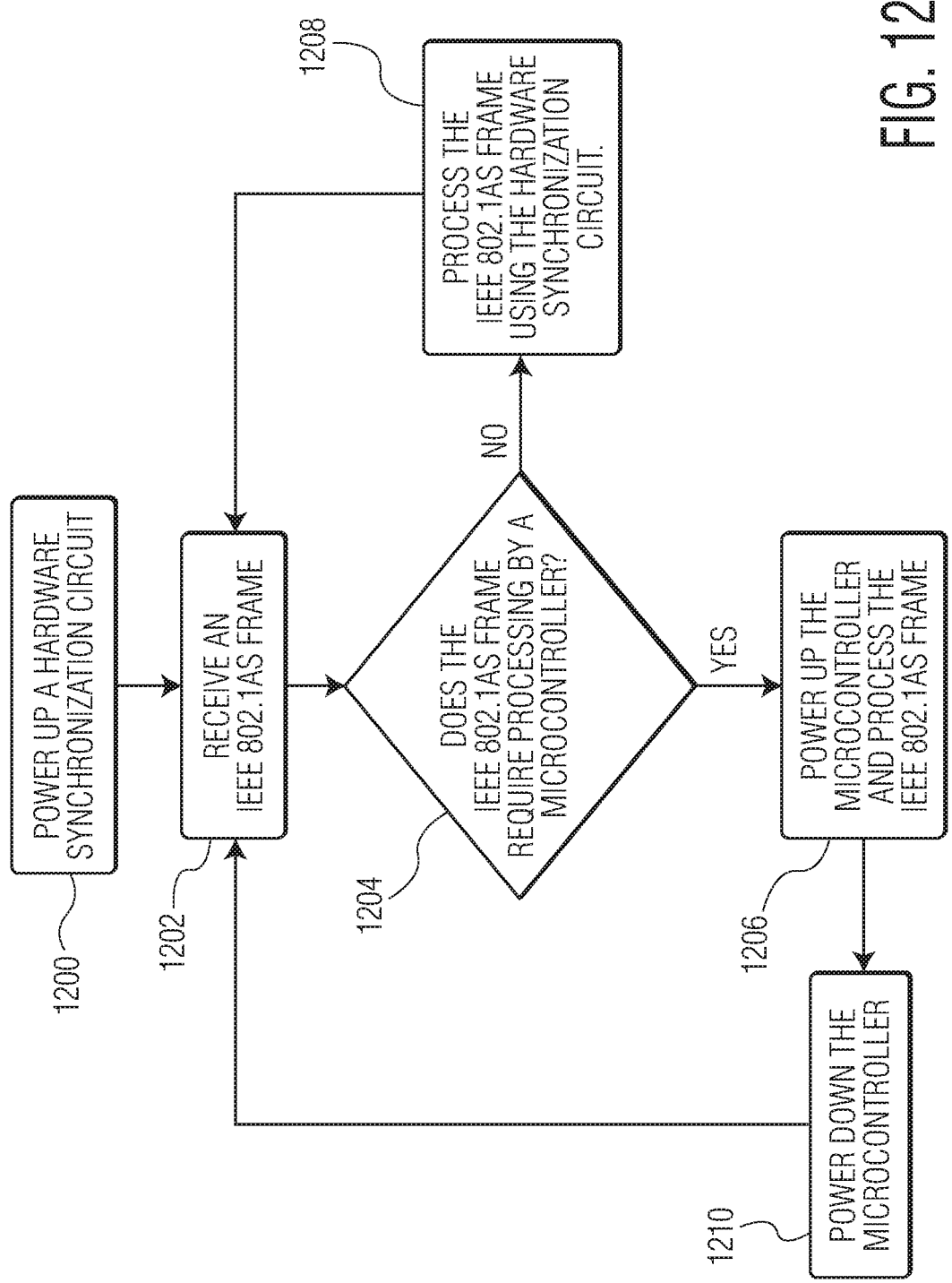
FIG. 12 is a flow chart diagram of a technique for processing synchronization frames in accordance with an embodiment of the invention.

FIG. 12 is a flow chart diagram of a technique for maintaining synchronization in accordance with an embodiment of the invention. At block 1200, a hardware synchronization module is powered up. At block 1202, an IEEE 802.1AS frame is received by a switch. At decision point 1204, it is determined if the IEEE 802.1AS frame requires processing by a microcontroller. In an embodiment, whether an IEEE 802.1AS frame requires processing by a microcontroller can be defined by a user, for example, as in the embodiments as described with reference to FIG. 5 above. If the IEEE 802.1AS frame requires processing by a microcontroller, then, at block 1206, the microcontroller powers up and processes the frame, at block 1210, the microcontroller is powered back down, and the technique returns to block 1202. If the IEEE 802.1AS frame does not require processing by a microcontroller, then, at block 1208, the frame is processed by a hardware synchronization circuit as described above and the technique returns to block 1202. The controller of the hardware synchronization circuit can be configured to determine if an IEEE 802.1AS frame requires processing by a microcontroller or if the frame can be processed by a hardware synchronization circuit.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a non-transitory computer-readable storage medium for execution by a computer. As an example, an embodiment of a non-transitory computer-readable storage medium includes a computer useable storage medium configured to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An integrated circuit (IC) device, the IC device comprising:
    an Ethernet frame processor;
    at least one Ethernet port coupled to the Ethernet frame processor; and
    a hardware synchronization circuit coupled to the Ethernet frame processor and to the at least one Ethernet port, the hardware synchronization circuit comprising:
        a controller;
        a local clock coupled to the controller;
        a media-independent peripheral coupled to the controller; and
        a media-dependent peripheral coupled to the media-independent peripheral;
    wherein power can be provided to the hardware synchronization circuit independent of the Ethernet frame processor;
    wherein the hardware synchronization circuit is configured to process messages according to the IEEE 802.1 AS standard to perform IEEE 802.1AS functions in hardware while the Ethernet frame processor is powered down, the IEEE 802.1AS functions performed in hardware comprising frame timestamping and at least one of residence time calculation, propagation delay calculation, rate ratio calculation, and neighbor rate ratio calculation;
    wherein the controller is configured to forward a frame to at least one of a microcontroller coupled to the IC device and the Ethernet frame processor when the frame includes an IEEE 802.1AS function that the hardware synchronization circuit cannot process.

2. The IC device of claim 1, wherein a double-type integer used in IEEE 802.1AS functions is stored in a 64-bit register within the hardware synchronization circuit with the first 4 bits allocated to an integer value and the trailing 60 bits allocated to a fractional value.

3. The IC device of claim 1, wherein timestamp values are stored within the hardware synchronization circuit using std_logic_vectors.

4. The IC device of claim 1, wherein rate ratio is calculated using a non-restoring division algorithm implemented via iterative subtraction and shifting using registers in the hardware synchronization circuit.

5. The IC device of claim 1, wherein residence time and propagation delay are calculated using subtraction and shift registers in the hardware synchronization circuit.

6. The IC device of claim 1, wherein a local synchronization clock is configured using separate adders and subtractors to detect and compute seconds and nanoseconds separately.

7. The IC device of claim 1, wherein the hardware synchronization circuit is configured to process a partial range of header data in an Ethernet frame and store the data in registers in the hardware synchronization circuit.

8. The IC device of claim 1, wherein the media-dependent peripheral is coupled to a single port.

9. A method for processing synchronized network frames, the method comprising:
    powering up a hardware synchronization circuit;
    receiving an IEEE 802.1AS frame;
    determining if the IEEE 802.1AS frame requires processing by a microcontroller;
    powering up the microcontroller, processing the IEEE 802.1AS frame using the microcontroller when the IEEE 802.1AS frame requires processing by a microcontroller, and powering down the microcontroller; and
    processing the IEEE 802.1AS frame using a hardware synchronization circuit when the IEEE 802.1AS frame does not require processing by a microcontroller, wherein processing the IEEE 802.1AS frame using a hardware synchronization circuit comprises performing an IEEE 802.1AS function in hardware while an Ethernet frame processor is powered down, the IEEE 802.1AS function performed in hardware comprising frame timestamping and at least one of residence time calculation, propagation delay calculation, rate ratio calculation, and neighbor rate ratio calculation;
    wherein the hardware synchronization circuit is configured to forward a frame to at least one of the microcontroller and the Ethernet frame processor when the frame includes an IEEE 802.1AS function that the hardware synchronization circuit cannot process.

10. The method of claim 9, wherein a double-type integer used in processing the IEEE 802.1AS frame is stored in a 64-bit register in the hardware synchronization circuit with the first 4 bits allocated to an integer value and the trailing 60 bits allocated to a fractional value.

11. The method of claim 9, wherein timestamp values are stored within the hardware synchronization circuit using std_logic_vectors.

12. The method of claim 9, wherein rate ratio is calculated using a non-restoring division algorithm implemented via iterative subtraction and shifting using registers in the hardware synchronization circuit.

13. The method of claim 9, wherein residence time and propagation delay are calculated using subtraction and shift registers in the hardware synchronization circuit.

14. The method of claim 9, wherein a local synchronization clock is configured using separate adders and subtractors to detect and compute seconds and nanoseconds separately.

15. The method of claim 9, wherein the hardware synchronization circuit is configured to process a partial range of header data in an Ethernet frame and store the data in registers in the hardware synchronization circuit.

16. An automobile Ethernet network, the network comprising:
- at least one switch, the switch configured with a hardware synchronization circuit and coupled to a switch microcontroller;
- at least one end node, the end node coupled to the switch, to an end node microcontroller, and to a transceiver within which a hardware synchronization circuit is configured; and
- a time-sensitive Ethernet device coupled to the end node microcontroller;
- wherein the network is synchronized using IEEE 802.1AS; and
- wherein IEEE 802.1AS functions are performed by the hardware synchronization circuit in the switch and by the hardware synchronization circuit in the transceiver within the end node that are configured to process messages according to the IEEE 802.1 AS standard in hardware while the switch microcontroller and end node microcontroller remain powered off, wherein the IEEE 802.1AS functions performed in hardware by the hardware synchronization circuits while the switch microcontroller and the end node microcontroller remain powered off comprise frame timestamping and at least one of residence time calculation, propagation delay calculation, rate ratio calculation, and neighbor rate ratio calculation, wherein the hardware synchronization circuit in the transceiver within the end node includes a controller configured to forward a frame to at least one of the end node microcontroller and an Ethernet frame processor of the end node when the frame includes an IEEE 802.1AS function that the hardware synchronization circuit cannot process.

17. The automobile Ethernet network of claim 16, wherein resynchronization of the powered off switch microcontroller can be facilitated by the hardware synchronization circuit in the at least one switch and resynchronization of the powered off end node microcontroller can be facilitated by the hardware synchronization circuit in the at least one end node.

\* \* \* \* \*